(12) United States Patent
Brodie et al.

(10) Patent No.: US 12,442,629 B2
(45) Date of Patent: Oct. 14, 2025

(54) GAUGE FOR MEASURING WEAR OF A BRAKE PAD

(71) Applicant: ZF CV Systems Europe BV, Brussels (BE)

(72) Inventors: Charles Brodie, West Bloomfield, MI (US); Thomas Corcoran, Leonard, MI (US); Donald Ford, Auburn Hills, MI (US); Kathryn Paul, Lapeer, MI (US)

(73) Assignee: ZF CV Systems Europe BV, Brussels (BE)

( * ) Notice: Subject to any disclaimer, the term of this patent is extended or adjusted under 35 U.S.C. 154(b) by 366 days.

(21) Appl. No.: 18/349,691

(22) Filed: Jul. 10, 2023

(65) Prior Publication Data

US 2024/0060764 A1    Feb. 22, 2024

Related U.S. Application Data

(60) Provisional application No. 63/398,824, filed on Aug. 17, 2022.

(51) Int. Cl.
*G01B 5/06* (2006.01)

(52) U.S. Cl.
CPC ...................... *G01B 5/06* (2013.01)

(58) Field of Classification Search
CPC ....................................................... G01B 5/06
USPC .................................. 33/609, 610, 793, 810
See application file for complete search history.

(56) References Cited

U.S. PATENT DOCUMENTS

| | | | | |
|---|---|---|---|---|
| 3,006,076 | A * | 10/1961 | Wisti | G01B 5/08 33/795 |
| 3,745,661 | A * | 7/1973 | Atzberger | G01B 5/08 33/795 |
| 3,827,153 | A * | 8/1974 | Mitchell | G01B 5/0028 33/42 |
| 5,509,208 | A * | 4/1996 | Oja | G01B 5/143 33/810 |
| 6,957,498 | B2 * | 10/2005 | Tsai | G01B 5/201 33/783 |
| 7,040,151 | B2 * | 5/2006 | Graham | G01B 5/0028 73/121 |
| 7,845,091 | B2 * | 12/2010 | Clark | G01B 5/0028 33/806 |
| 8,826,557 | B2 * | 9/2014 | Yang | G01B 3/20 33/808 |
| 9,500,462 | B2 * | 11/2016 | Reble | G01B 5/0028 |

(Continued)

*Primary Examiner* — George B Bennett
(74) *Attorney, Agent, or Firm* — Walter Ottesen, P.A.

(57) ABSTRACT

A gauge for measuring wear of a brake pad of a brake includes a first component having a first longitudinal portion extending in a longitudinal direction; the first component further has a jaw extending transversely from said first longitudinal portion. The jaw has a first contact region configured to contact a first side of a brake assembly. A second component has a second longitudinal portion extending in the longitudinal direction and a scale portion. A slide is configured to longitudinally slide along the scale portion. The slide has a second contact region configured to contact a second side of the brake assembly. The first and second components are interconnectable in a first relative position and a second relative position. The first and second contact regions define a mutual distance indicative of a thickness of the brake pad when applied to a brake caliper with the brake applied.

11 Claims, 6 Drawing Sheets

(56) References Cited

U.S. PATENT DOCUMENTS 10,493,973 B2 * 12/2019 Esnouf .................... F16D 65/12
10,508,894 B2 * 12/2019 White .................... B60T 17/221
12,359,701 B2 * 7/2025 Hecker ................. B60T 17/221

* cited by examiner

GAUGE FOR MEASURING WEAR OF A BRAKE PAD

TECHNICAL FIELD

The disclosure relates to a gauge for measuring the wear of a brake pad of a vehicle.

This application claims benefit of and priority from U.S. provisional application 63/398,824, filed Aug. 17, 2022, and the entire content of this application is incorporated herein by reference.

BACKGROUND

In the trucking industry, brakes need to be regularly inspected for a level of wear on the brake pad. In making the wear determination, a remaining brake pad life can also be determined. Currently available devices for measuring the brake caliper can only measure one side of the brake caliper.

SUMMARY

It is an object of the disclosure to provide a gauge for measuring wear of a brake pad with multiple measuring positions for improved measuring of the brake pad.

The aforementioned object can, for example, be achieved via a gauge for measuring wear of a brake pad. The gauge includes a first component having a first longitudinal portion extending in a longitudinal direction. The first component further has a jaw extending transversely from the first longitudinal portion. The jaw is configured to engage a first side of a brake component. A second component of the gauge has a second longitudinal portion extending in the longitudinal direction and a scale portion. A slide element is configured to longitudinally slide along the scale portion of the second component. The slide element has an adjustable jaw having a contact region configured to engage a second side of the brake component. The first component and the second component are interconnectable in a first relative position and a second relative position. The jaw and the slide jaw define a mutual distance indicating a thickness of the brake pad when applied to a brake caliper with the brake applied.

In an embodiment, the gauge further includes a first connecting pin and a second connecting pin. At least one of the first component and the second component defines at least three openings. The first connecting pin and the second connecting pin are configured to interconnect the first component and the second component in the first relative position and the second relative position via the openings.

In a further embodiment, a retainer is configured to engage at least one of the first connecting pin and the second connecting pin.

In an embodiment, the first contact region is a protrusion configured to contact the first side of the brake assembly.

The slide has a marking in an embodiment. The scale portion includes a scale which, in conjunction with the marking, indicates at least one of the thickness of the brake pad and an amount of wear of the brake pad.

In an embodiment, the brake assembly is a component of an air brake.

The gauge is configured to measure the wear of the brake pad with or without a wheel being mounted in an embodiment.

In an embodiment, the first contact region is configured to contact an outboard rotor surface of the brake assembly.

In a further embodiment, the second contact region is configured to contact a guide pin of the brake assembly.

In a further embodiment, the second contact region is configured to alternatively contact a long guide pin of an air brake and a short guide pin of the air brake.

BRIEF DESCRIPTION OF DRAWINGS

The invention will now be described with reference to the drawings wherein.

DETAILED DESCRIPTION

Figure 1:
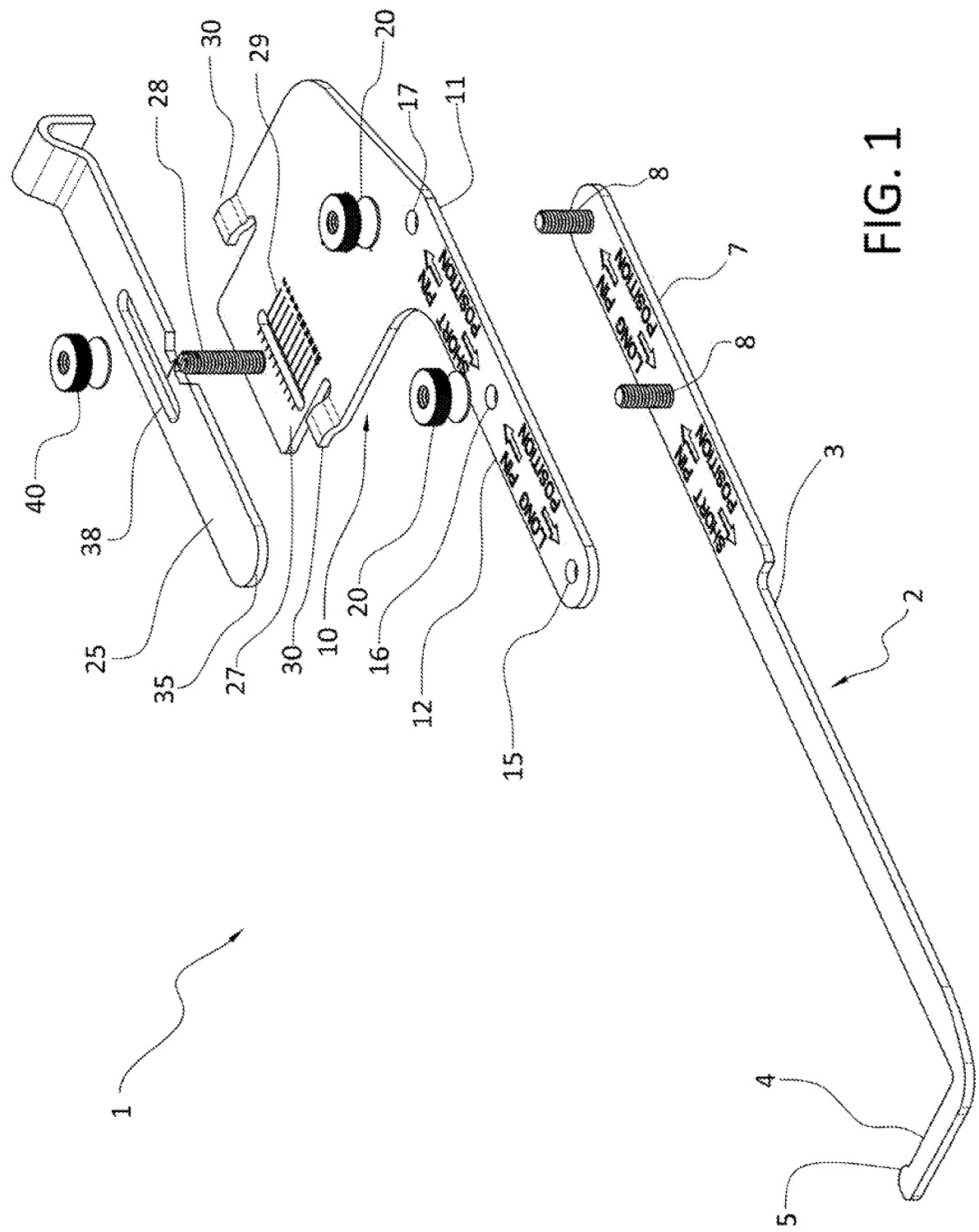
FIG. 1 shows a gauge for measuring wear of a brake pad according to the disclosure in an exploded view.

FIG. 1 shows a gauge 1 for determining the wear of a brake pad according to the disclosure in an exploded view. The gauge has a first component 2 having a longitudinal portion 3 and a jaw 4. The jaw 4 is configured to engage a first side of a brake assembly, in particular, the outboard rotor surface, in a first direction 55. In the embodiment shown in FIG. 1, the jaw includes a first contact region/point 5 shown in the form of a protrusion for contacting the outboard rotor surface. The longitudinal portion 3 includes a connecting region 7. In the shown embodiment, the connecting region includes two pins 8 for connecting the first component 2 to a second component 10.

In the embodiment of FIG. 1, the second component 10 includes a longitudinal portion 11 which includes a connection region 12. The connection region 12 defines three openings 15, 16, 17. The pins 8 are configured to be inserted through the openings 15, 16, 17. When the pins 8 are inserted through openings 16 and 17, the first component 2 and the second component 10 are in a first relative position (shown in FIG. 2). When the pins 8 are inserted through the openings 15 and 16, the first component 2 and the second component 10 are in a second relative position.

Retainers 20 can be used to fixedly hold the pins 8 in the openings 15, 16, 17. In the embodiment shown in FIG. 1, the pins are provided with an outer thread which is configured to engage an inner thread of the retainers 20 configured as a nut.

In alternative embodiments, the first component 2 and the second component 10 can be held in the first and second relative positions via different configurations. For example, the openings 15, 16, 17 could be provided in the second component 10 and the pins 8 could be provided on the first component. Further, different mechanisms can also be used to hold the first component 2 and the second component 10 in the first and second relative positions, such as a tongue and groove arrangement, a clamping arrangement, et cetera.

The second component 10 further includes a scale region 27. A slide 25 can be attached to the second component 10 at the scale region 27. The slide 25 has a second contact region/point 35 for engaging a second side of the brake assembly. The slide 25 can be moved relative to the scale region 27 in the longitudinal direction of the gauge 1. The first contact point 5 and the second contact point 35 define a mutual distance indicative of a thickness of the brake pad when applied to a brake assembly with the brake applied. The mutual distance can include further thicknesses of other components. The thickness of the brake pad and the wear of the brake pad can be derived from the mutual distance of the contact points 5, 35.

In the embodiment shown in FIG. 1, the slide 25 defines a slot 38. A pin 28 projecting out of the scale region 27 of the second component 10 can be inserted through the slot 38. The slot 38 provides play for the pin 28 in the longitudinal direction so that the slide 25 can move along the scale region 27 to adjust for measuring wear of the brake pad. A retainer 40 can be used to hold the slide 25 on the second component 10. When loose, the retainer 40 enables a sliding movement of the slide 25 relative to the second component 10 in the longitudinal direction. When tightened, the retainer 40 fixes the slide 25 relative to the second component 10. The second component 10 can further include guide ledges 30 which guide the slide 25 in the longitudinal direction. The slide 25 can, however, be connected to the second component 10 in another manner which allows sliding in the longitudinal direction.

The slide 25 has a marking 41. The scale region 27 includes a scale 29. The marking 41 and the scale 29 conjointly indicate a thickness of the brake assembly and/or brake pad.

The two relative positions enable the gauge 1 to be used in two different positions on a brake assembly for measuring pad wear. The first contact point 5 of the gauge contacts the outboard rotor surface of the brake assembly, while the second contact point 35, in the first relative position, is configured to contact a first component of the brake assembly and, in the second relative position, is configured to contact a second component of the brake assembly. An air brake can, in particular, include a long guide pin and a short guide pin. According to various embodiments, the gauge 1 is configured such that the contact point 35 is for contacting the short pin in the first relative position and for contacting the long pin in the second relative position.

In certain situations, one of the two contact points on the brake assembly that is used as a contact point may be difficult to access. The gauge 1 according to the disclosure enables a person measuring the pad wear to use an alternate contact point which is easier to access and/or in which it is easier to position the gauge 1 for measuring. With the gauge 1 according to the disclosure, the measurement of the thickness of the brake pad can also be performed at two locations for higher accuracy. The measurements can be performed with or without the wheel being mounted.

Figure 2:
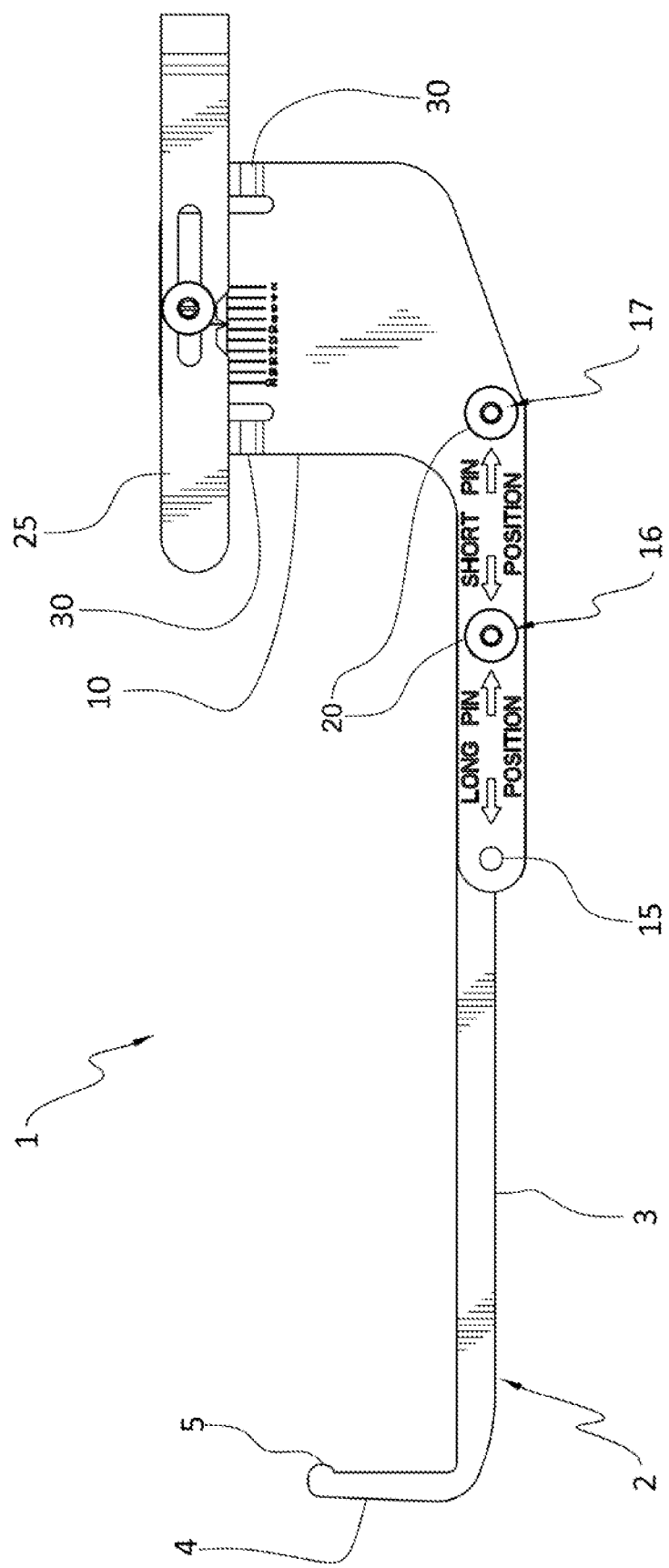
FIG. 2 shows the gauge for measuring wear of a brake pad of FIG. 1 in a first position.

FIG. 2 shows the gauge 1 in the short pin position with the pins 8 inserted through the openings 16 and 17. The retainers 20 are applied to the pins 8 so as to fixedly hold the first component 2 and the second component 10 relative to each other in the first relative position, here the short pin position. In the short pin position, the second contact point 35 is applied to the short guide pin of the air brake.

Figure 3:
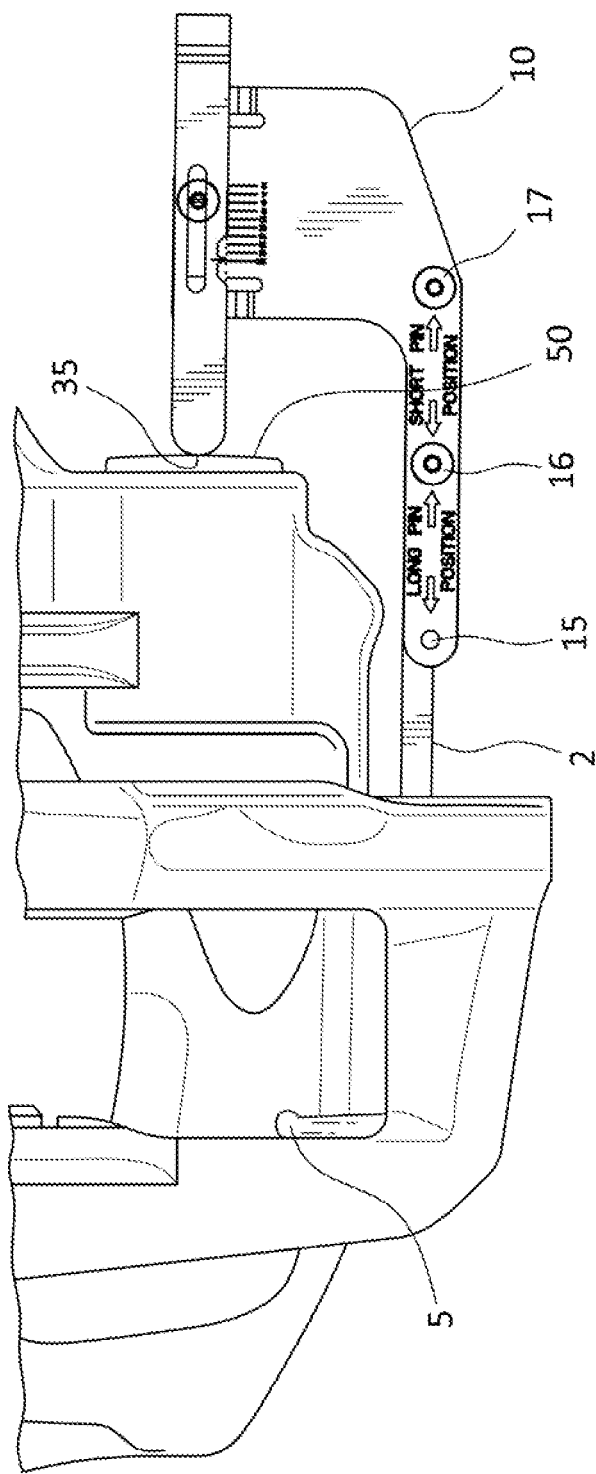
FIG. 3 shows the gauge of FIG. 2 while measuring a thickness of a brake component.

FIG. 3 shows the gauge 1 of FIG. 2 while measuring the thickness of the brake pad. The second contact point 35 is applied to the short guide pin 50 and the first contact point is applied to the outboard rotor surface of the brake assembly 45.

Figure 4:
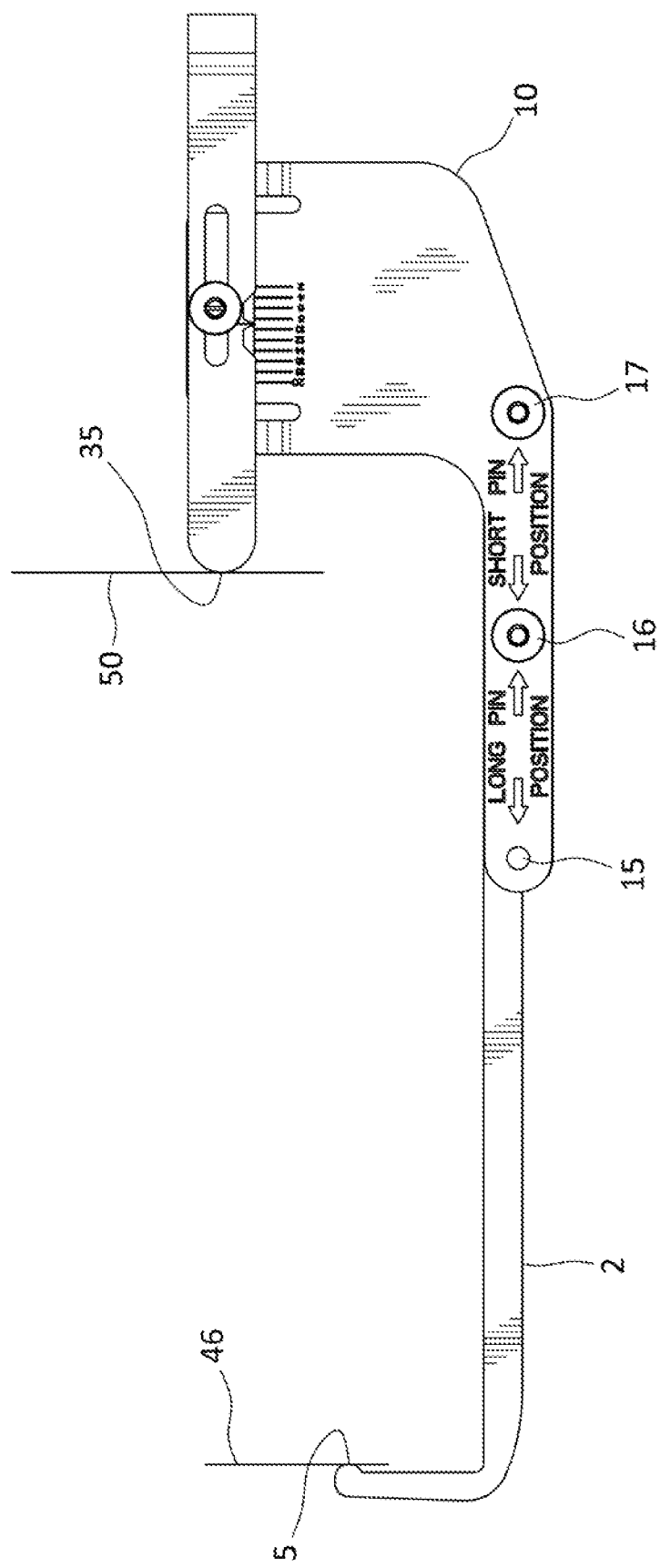
FIG. 4 is a schematic representation of the gauge in the first position while measuring a thickness of a brake component.

FIG. 4 is a schematic representation of the gauge 1 in the short pin position with the first contact point applied to the outboard rotor surface 46 and the second contact point 35 applied to the short guide pin 50.

Figure 5:
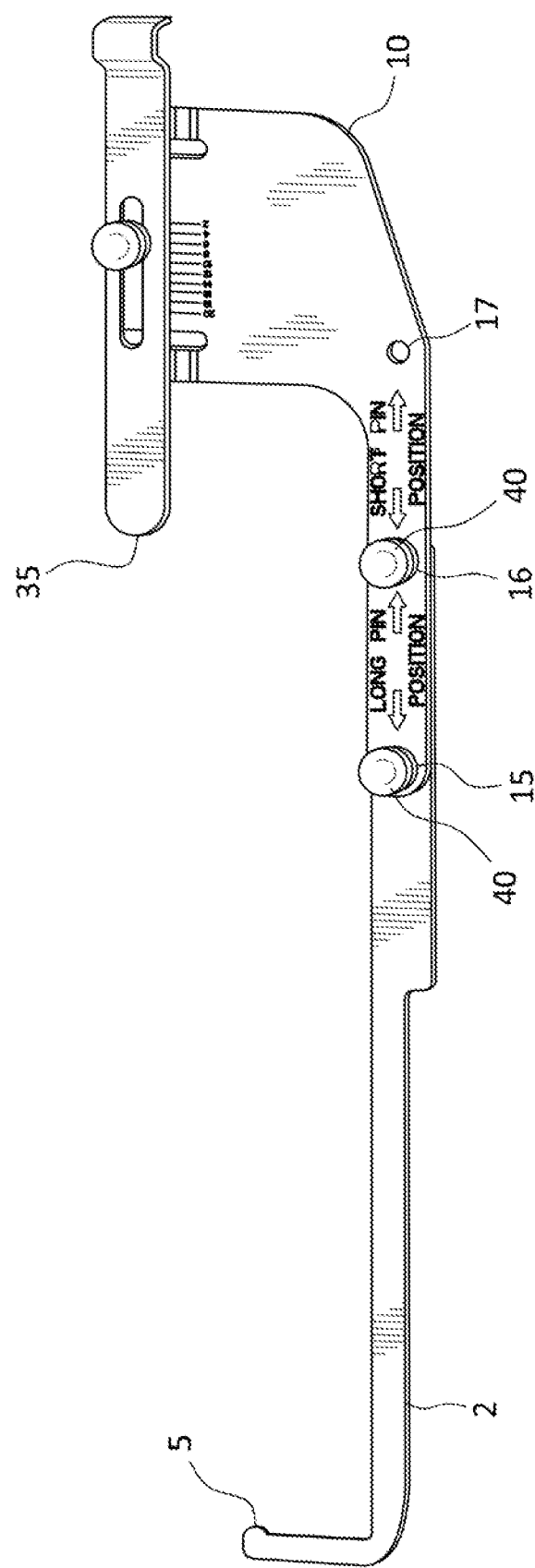
FIG. 5 shows the gauge in a second position.

FIG. 5 shows the gauge 1 in the long pin position with the pins 8 inserted through the openings 15 and 16. The retainers 40 are applied to the pins so as to hold the first component 2 and the second component 10 in the second relative position, here the long pin position.

Figure 6:
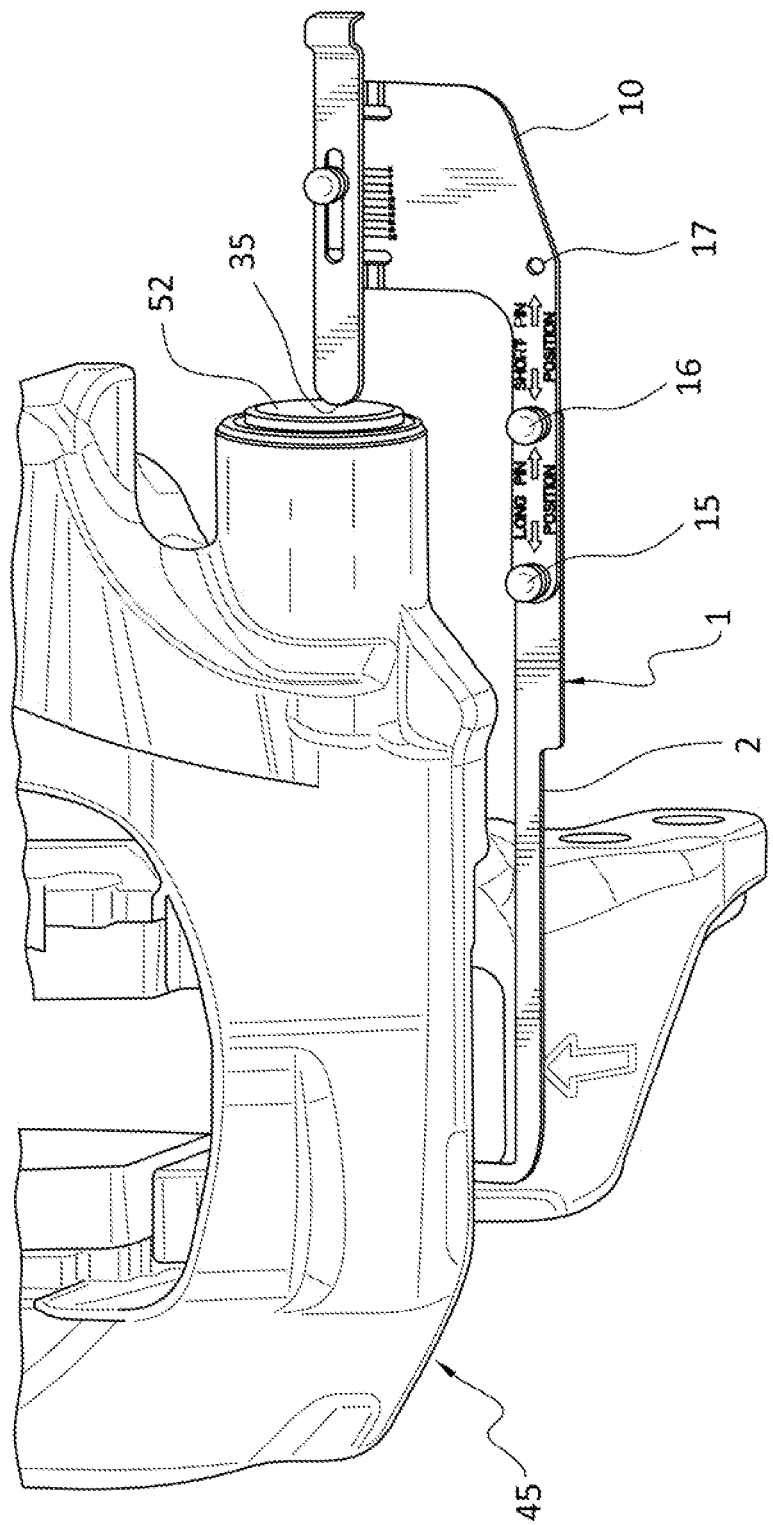
FIG. 6 shows the gauge in the second position of FIG. 5 while measuring a thickness of a brake component.

FIG. 6 shows the gauge 1 in the long pin position of FIG. 5 with the first contact point 5 applied to the outboard rotor surface and the second contact point 35 applied to the long guide pin 52.

It is understood that the foregoing description is that of the preferred embodiments of the invention and that various changes and modifications may be made thereto without departing from the spirit and scope of the invention as defined in the appended claims.

The invention claimed is:

1. A gauge for measuring wear of a brake pad of a brake, the gauge comprising:
   a first component having a first longitudinal portion extending in a longitudinal direction;
   said first component further having a jaw extending transversely from said first longitudinal portion;
   said jaw having a first contact region configured to contact a first side of a brake assembly;
   a second component having a second longitudinal portion extending in the longitudinal direction and a scale portion;
   a slide configured to longitudinally slide along said scale portion of said second component;
   said slide having a second contact region configured to contact a second side of the brake assembly;
   said first component and said second component being interconnectable in a first relative position and a second relative position; and,
   wherein said first contact region and said second contact region define a mutual distance indicative of a thickness of the brake pad when applied to a brake caliper with the brake applied.

2. The gauge of claim 1 further comprising:
   a first connecting pin and a second connecting pin;
   at least one of said first component and said second component defining at least three openings; and,
   said first connecting pin and said second connecting pin being configured to interconnect said first component and said second component in said first relative position and said second relative position via said openings.

3. The gauge of claim 2 further comprising a retainer configured to engage at least one of said first connecting pin and said second connecting pin.

4. The gauge of claim 1, wherein said first contact region is a protrusion configured to contact the first side of the brake assembly.

5. The gauge of claim 1, wherein said slide has a marking; and, said scale portion includes a scale which, in conjunction with said marking, indicates at least one of the thickness of the brake pad and an amount of wear of the brake pad.

6. The gauge of claim 1, wherein the brake assembly is a component of an air brake.

7. The gauge of claim 1, wherein the gauge is configured to measure the wear of the brake pad with or without a wheel being mounted.

8. The gauge of claim 1, wherein said first contact region is configured to contact an outboard rotor surface of the brake assembly.

9. The gauge of claim 1, wherein said second contact region is configured to contact a guide pin of the brake assembly.

10. The gauge of claim 1, wherein said second contact region is configured to alternatively contact a long guide pin of an air brake and a short guide pin of the air brake.

11. The gauge of claim 1, wherein said first contact region is configured to contact an outboard rotor surface of the brake assembly; and, said second contact region is configured to alternatively contact a long guide pin of an air brake and a short guide pin of the air brake.

* * * * *